(12) United States Patent
Greve

(10) Patent No.: US 8,469,778 B1
(45) Date of Patent: Jun. 25, 2013

(54) LONG-LIFE PEELER INSERTS AND HOLDDOWNS

(71) Applicant: Laitram, L.L.C., Harahan, LA (US)

(72) Inventor: Christopher G. Greve, Covington, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 13/654,556

(22) Filed: Oct. 18, 2012

(51) Int. Cl.
*A22C 29/02* (2006.01)

(52) U.S. Cl.
USPC .................................................. 452/5

(58) Field of Classification Search
USPC .................................. 452/1, 2, 5, 9
See application file for complete search history.

(56) References Cited

U.S. PATENT DOCUMENTS

| 2,537,355 | A | 1/1951 | Lapeyre et al. | |
|---|---|---|---|---|
| 2,778,055 | A | 1/1957 | Lapeyre et al. | |
| D224,151 | S | 7/1972 | Lapeyre | |
| D224,152 | S | 7/1972 | Lapeyre | |
| D224,153 | S | 7/1972 | Lapeyre | |
| 3,706,113 | A | 12/1972 | Lapeyre et al. | |
| 6,017,268 | A * | 1/2000 | Rosow et al. | 452/5 |
| 6,248,010 | B1 | 6/2001 | Sirgo et al. | |
| 7,811,157 | B1 * | 10/2010 | Wimberly, Jr. | 452/5 |

* cited by examiner

*Primary Examiner* — Richard Price, Jr.
(74) *Attorney, Agent, or Firm* — James T. Cronvich

(57) ABSTRACT

A peeling machine having series of insert rollers held down into notches between larger-diameter power rollers by holddowns. The holddowns include pins made of a bearing material received directly in bores in the ends of the insert rollers without conventional bearing sleeves. The heads of the pins may be coned to provide thrust bearings against concave interior ends of the bores.

16 Claims, 5 Drawing Sheets

LONG-LIFE PEELER INSERTS AND HOLDDOWNS

BACKGROUND

The invention relates to peeling apparatus and, more particularly, to roller-type shrimp-peeling machinery.

Originally introduced because of the high labor costs of peeling small shrimp by hand, shrimp-peeling machines are now widely used in the shrimp-processing industry. Roller-type peeling machines, in particular, dominate the bulk shrimp-peeling industry. U.S. Pat. Nos. 2,778,055, Jan. 22, 1957, and 2,537,355, Jan. 9, 1951, both to Fernand S., James M., and Emile M. Lapeyre, describe the basic structure and principles of operation of roller-type shrimp peelers.

In the upper peeling sections of conventional roller-type peelers, a series of small diameter stainless steel insert rollers rest between and on a rubber-coated upper power roller and an adjacent rubber-coated lower power roller vertically and horizontally offset from the upper roller. The insert rollers are rotated by contact with the rubber-coated rollers. Peeling nips are formed between the insert rollers and the lower rollers. The rollers rotate continuously in one direction and then the other to grab and release shrimp urged down the lengths of the rollers by a stream of water and gravity. The insert rollers are held down in the notches between the larger-diameter upper and lower power rollers by holddowns. As shown in FIG. 9, conventional holddowns 154 include a narrow strap 156 that fits through the narrow space between the lower and upper rollers and that has a hooked portion 158 at one end encircling and retaining a cylindrical stainless steel pin 160. Springs attached between the peeler frame below and holes 162 in the straps bias the holddowns into contact against the rubber-coated rollers. The insert rollers 164 are made of stainless steel and have axial bores 166 formed in each end. The bores are lined with a bronze bearing sleeve 168. The holddown pins are received in the bores. The insert rollers rotate on the pins with the bronze bearing sleeves providing a low-friction bearing surface to the stainless steel pins.

When a conventional insert roller is new, as in FIG. 10A, the holddown pin 160 rests on the bearing sleeve 168 in the bottom of the bore of the insert roller 164. The contact area between the pin and the sleeve is relatively broad. (In both figures, the diameter of the pin is exaggeratedly small relative to the diameter of the bore for better viewing.) As the bronze bearing sleeve wears, however, as shown in FIG. 10B, the contact area decreases to close to an axial line of contact 171 along the bottom of the bore 166. Furthermore, because the bottom of the bronze bearing has largely worn away, the stainless steel pin 160 bears directly on the stainless steel bore wall 172 of the insert roller 164. This stainless-on-stainless contact increases friction and can cause galling.

The depth of the bore 166 in the insert 164 is greater than the distance of the blunt ends 174 of the pin from the side 175 of the hooked portion 158 of the holddown, as shown in FIG. 9. This makes it possible for the insert rollers 164 to contact the sides 175 of the stainless steel hook portion 158 of the holddowns 154. The rotation of the insert on the hooked portion produces an annoying squeaking sound, as well as an increase in friction.

Thus, there is a need for a less noisy peeler with longer lasting insert rollers and holddown pins.

SUMMARY

This need and others are provided by an insert-roller system embodying features of the invention. One version of such a system for a roller-type peeler comprises a holddown and an insert roller. The holddown includes a holder at one end of a shank. A pin is retained in the holder. The insert roller is made of a wear-resistant material, such as stainless steel. A bore at one end of the insert roller is bounded by a bore wall. The holddown pin is received in the bore. The pin is made of a different material from the insert roller and serves as a bearing surface against the bore wall as the insert roller rotates on the pin.

Another version of an insert-roller system for a roller-type peeler comprises a holddown and an insert roller. The holddown includes a holder at one end of a shank. A pin having a coned head at one end is retained in the holder. An axial bore at one end of the insert roller has a concave blind end bearing against the coned head of the pin, which serves as a thrust bearing to prevent contact between the insert roller and the holder.

According to another aspect of the invention, a peeler comprises a plurality of reciprocating upper rollers spaced apart laterally across the width of the peeler. An array of lower rollers underlies the array of upper rollers along a portion of the length of the peeler at positions below and laterally offset from the upper rollers. Series of insert rollers are made of a wear-resistant material. Each series of insert rollers extends along the length of the peeler and rests simultaneously on one of the upper rollers and one of the adjacent lower rollers. Each of the insert rollers has opposite ends with an axial bore in each end. Holddowns each have a holder retaining a pin at an upper end. A shank portion extends downward from the holder through a gap between one of the upper rollers and an adjacent one of the lower rollers. The shank is biased downward. The pins are made of a material different from the wear-resistant material of the insert rollers. The pins are received in the axial bores of the insert rollers, which rotate on the pins.

BRIEF DESCRIPTION OF THE DRAWINGS

These aspects and features of the invention are described in more detail in the following description, appended claims, and accompanying drawings, in which:

DETAILED DESCRIPTION

Figure 1:
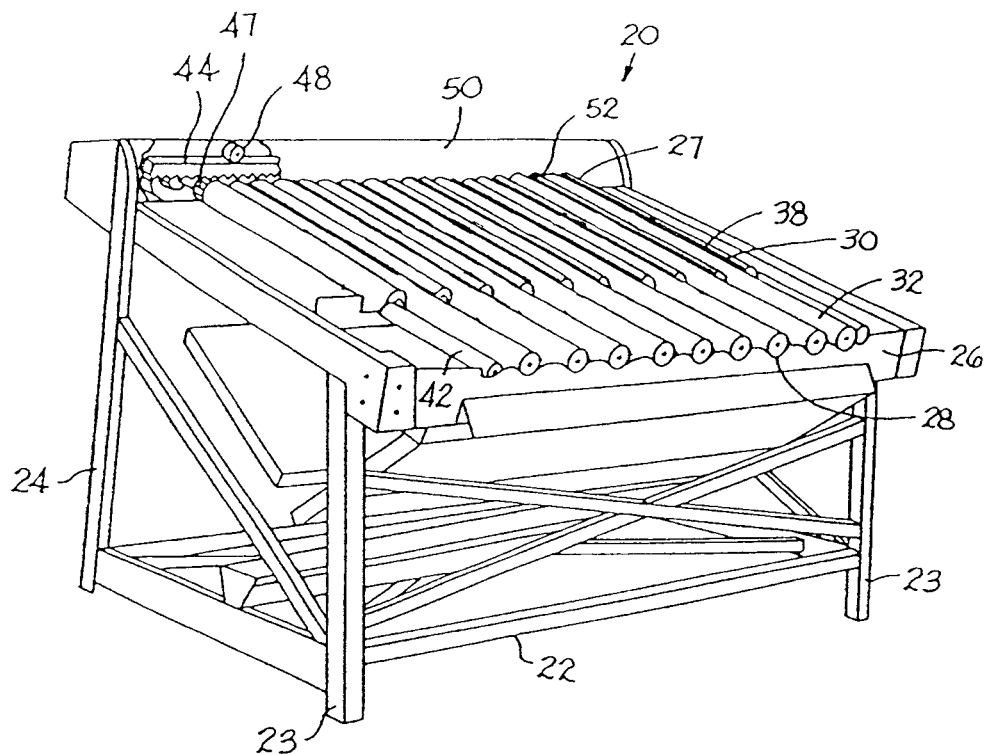
FIG. 1 is a perspective view of a roller-type peeler embodying features of the invention.
Figure 2:
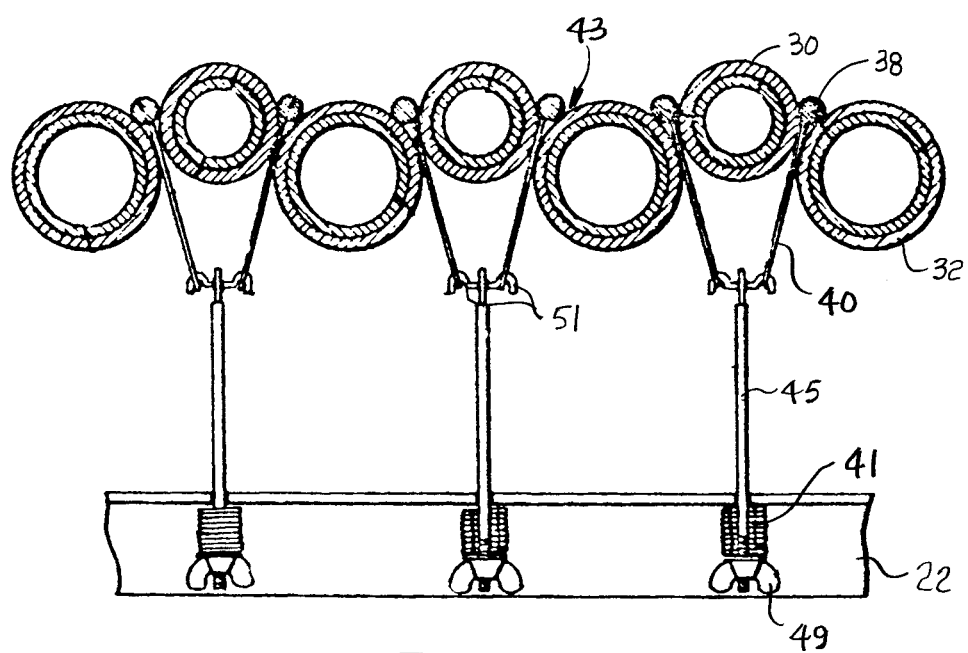
FIG. 2 is a cross sectional view of a portion of an upper peeling section of the peeler of FIG. 1.

An exemplary version of a peeling apparatus embodying features of the invention is shown in FIGS. 1 and 2. The peeling apparatus 20, which is typically used to peel shrimp, includes a frame 22 consisting of front and rear legs 23, 24 forming a framework with various cross-bracing and support members. A bed 26 supports peeling rollers that slope downward from a first product-entrance end 27 to a second product-exit end 28. (To simplify the drawing, a finger frame, typically used to urge shrimp into peeling positions, is not shown.) The rollers shown in FIG. 1 include two kinds of powered rollers: upper channel-forming rollers 30 and lower power rollers 32. In an upper peeling portion of the peeling apparatus, a plurality of side-by-side peeling channels are formed by a lower power roller 32 flanked by two upper channel-forming rollers 30. All three rollers forming each upper channel are powered directly by the peeling apparatus's drive system. Each of these rollers is made of a tube, typically steel, coated with a coating such as a rubber-like material to form an outer peeling surface. The coating could be a polyurethane, as well as other synthetic or natural materials, to provide the peeling effectiveness or durability required by the application. The coating could be left off and the uncoated tube constructed entirely of stainless steel, for instance, with or without a knurled, sandblasted, or otherwise textured surface. The upper peeling channels are further formed by narrow-diameter insert rollers 38 held down into the notches between the power rollers. The insert rollers rotate by contact with the power rollers, which are driven alternately clockwise and counterclockwise by the drive system. The insert rollers are typically made of stainless steel with or without surface texturing. The insert rollers are encircled at various positions along the channel by holddowns 40. The holddowns, which are attached to the frame 22, are tensioned by springs 41, for example, to pull the insert rollers 38 down into the notches to form peeling nips 43 with the lower rollers. Rods 45 are each threaded at a bottom end with a wing nut 49 compressing the spring 41 surrounding the rod against the frame 22. Hooks 51 at the end of the rod hook into holes in the holddowns 40. The spring pressure is adjusted with the wing nut 49.

A lower peeling portion of the peeling apparatus is formed by the lower power rollers 32 supported on lower idle rollers 42. Unlike the power rollers 32 and the channel-forming rollers 30, the lower idle rollers 42 are passive and rotate only by frictional contact with the power rollers. Like the power rollers, the lower idle rollers are tubes preferably coated with a rubber-like material. The channel-forming power rollers 30 and the insert rollers 38 do not extend down into this lower peeling portion of the apparatus. The peeling nip formed in the lower peeling section produces a peeling action different from that in the upper peeling section. Subjecting product to be peeled, such as shrimp, to both kinds of peeling action produces a more effectively peeled product.

Both the upper channel-forming rollers 30 and the lower power rollers 32 are powered at the upper end of the peeling apparatus. A drive system comprising, for example, a rack gear 44 linked to a crank and a pitman arm driven by a motor (not shown) is used to reciprocate the rack gear. A drive member 46, including a toothed gear wheel 47 connected at a first end of each of the powered roller assemblies, meshes with the rack gear. As the rack gear reciprocates, the powered roller assemblies rotate clockwise and counterclockwise in synchrony with the rack. Idler wheels 48, in rolling contact with the upper surface of the rack, retain it in position. A cover plate 50 at the first upper end of the powered roller assemblies may be used to separate the drive system from the peeling channels. Openings 52 formed in the plate admit the drive member portion of the powered roller assemblies into an engagement position with the drive system of the peeling apparatus.

Figure 3:
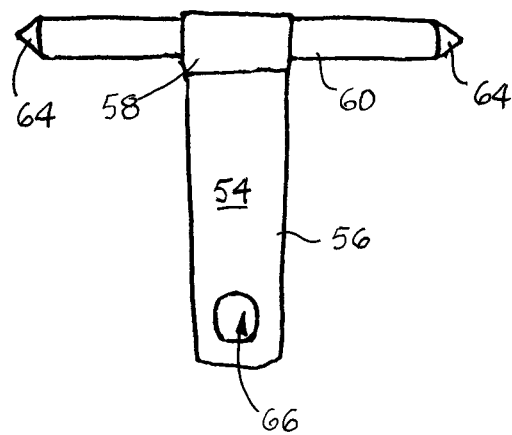
FIG. 3 is a side view of an interior insert holddown of the peeler of FIG. 1.
Figure 4:
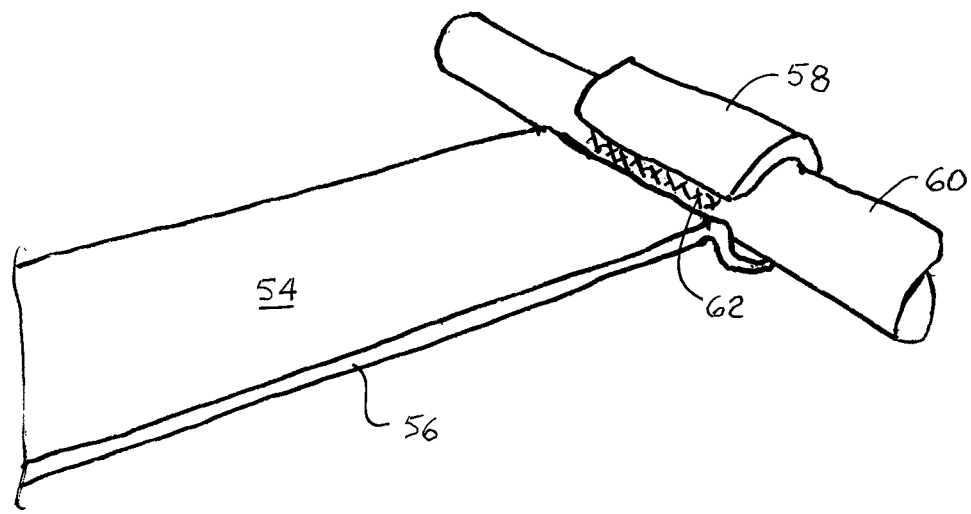
FIG. 4 is an enlarged perspective view of a portion of the interior holddown of FIG. 3.

An interior holddown 54 used between consecutive insert rollers is shown in FIGS. 3 and 4. The holddown 54 is shown as a narrow strap having a shank 56 and a hook-like holder 58 at the top end of the shank. The strap is made of a durable, wear-resistant material, such as stainless steel. A pin 60 is retained in the holder 58 by a press fit, for example. The pin is knurled 62 for better retention in the holder. The pin 60 in the interior holddown 54 extends outward in opposite directions from the holder and terminates in coned heads 64 at each end. A hole 66 in the bottom end of the strap engages the hooks 51 on the threaded rod 45, as shown in FIG. 2. The pin is made of a bearing material different from the strap material. Bronze is one example of the bearing material for the pin.

Figure 5:
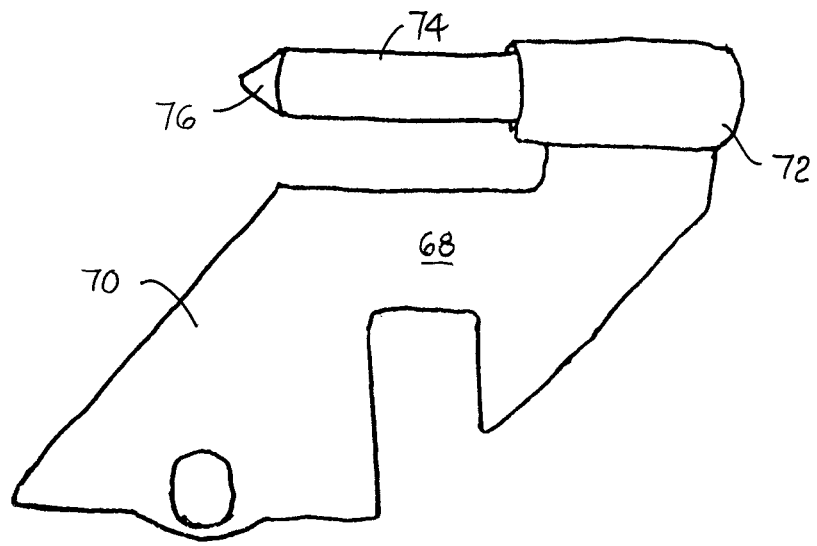
FIG. 5 is a side view of an outer holddown of the peeler of FIG. 1.

FIG. 5 shows an outer holddown 68 that engages the outer ends of the first and last insert rollers in an insert-roller series. The outer holddowns have a lower shank 70 that differs in shape from the shank of the interior holddowns 54. The difference is for conforming to the structure of the peeler at the upper and lower ends of the upper peeling channels and to direct the line of force biasing the holddown into the end of the insert roller with an axial, as well as a radial, component. The outer holddowns 68 have a holder 72 for a one-sided pin 74 terminating in a single coned head 76. The pin 74 is made of a bearing material, such as bronze, and the holder and shank are made of a harder, wear-resistant material, such as stainless steel.

Figure 6:
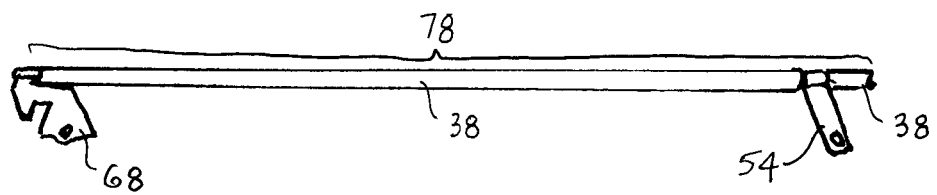
FIG. 6 is a perspective view of one end of an insert series of the peeler of FIG. 1.

As shown in FIG. 6, each insert-roller section 78 is made up of a series of insert rollers 38 that rotate on the pins of holddowns—outer holddown 68 at the two ends of the series of inserts and interior holddowns 54 between consecutive insert rollers.

Figure 7:
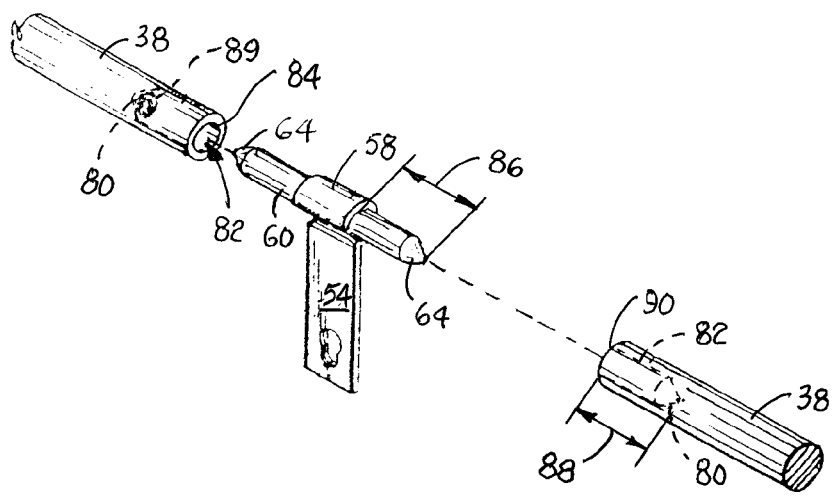
FIG. 7 is an exploded view of a holddown as in FIG. 3 showing its connection to two inserts.
Figure 9:
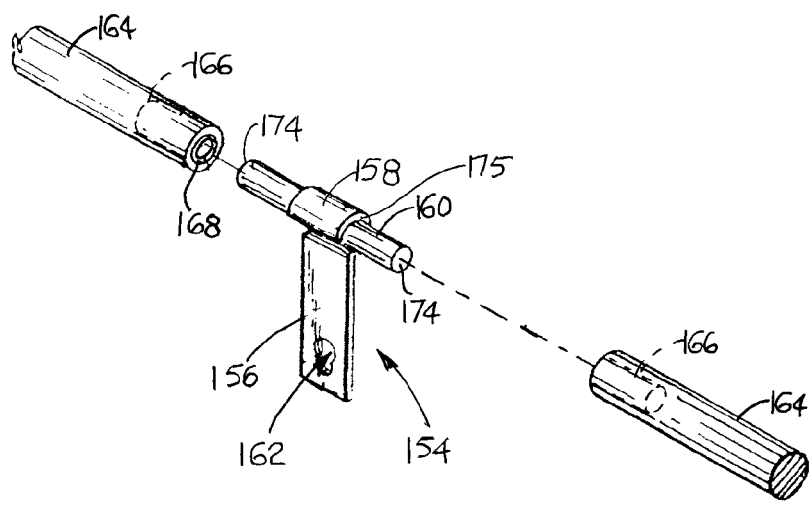
FIG. 9 is an exploded view of a holddown of the prior art, showing its connection to two prior art inserts.

As shown in FIG. 7, the opposite coned heads 64 of an interior holddown 54 bear against concave blind ends 80 of axial bores 82 in the ends of each insert roller 38. The blind ends 80 are, for example, complementary conical end walls of bore walls 84 bounding and defining the bores 82. The distance 86 from the holder 58 to the tip end of the pin's coned head 64 is preferably greater than the length 88 of the axial bore 82 in the insert roller 38 so that the end face 90 of the insert roller doesn't bear against the holder 58. Thus, the conical head 64 of the pin 64 serves as a thrust bearing against the insert roller 38. As an alternative, ball bearings 89 pressed or otherwise deposited in the bores 82 between the interior end walls 80 and the ends of the pins 60, which can be flat as in FIG. 9, rather than coned, can serve as thrust bearings between the insert rollers 38 and the holddowns 54 to reduce noise.

Figure 8A:
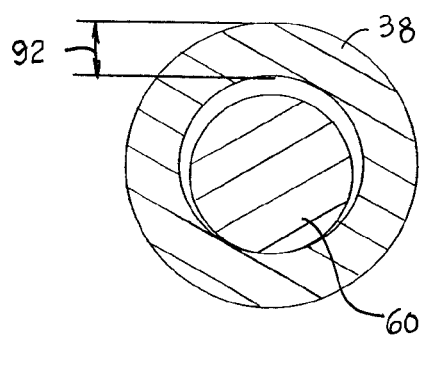
FIGS. 8A and 8B are exaggerated cross sections of the end of insert of FIG. 6 in new and worn conditions.
Figure 8B:
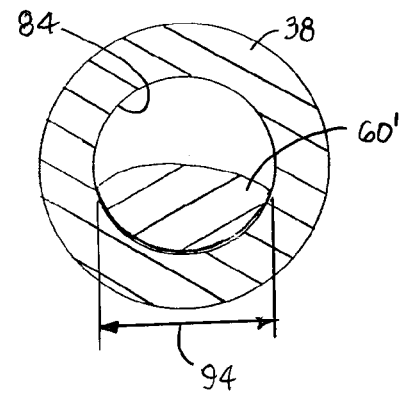
Figure 10A:
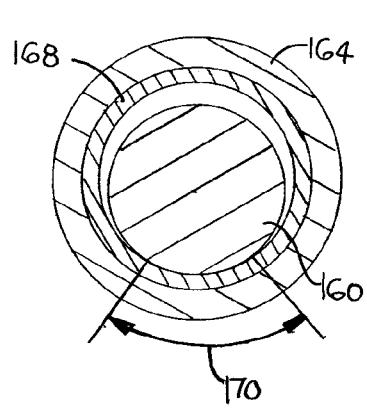
FIGS. 10A and 10B are exaggerated cross sections of the end of one of the inserts of FIG. 9 in new and worn conditions.
Figure 10B:
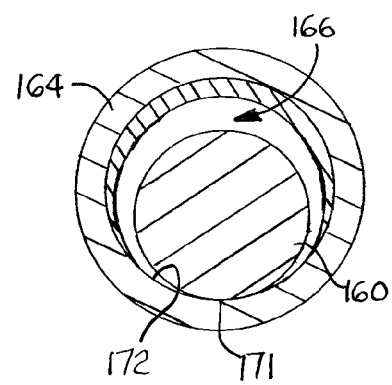

As shown in FIGS. 8A and 8B, the insert roller 38 does not require a bearing sleeve 168 as in the prior art insert 164 of FIGS. 10A and 10B. For this reason, the bore 82 in the improved insert roller 38 can be small in diameter, which allows for a greater bore wall thickness 92 resistant to flaring. When the holddown pin 60 is new, it is cylindrical, as in FIG. 8A. As the pin 60' wears, as shown in FIG. 8B, its softer material conforms to the shape of the bore and provides a large bearing contact area 94 with the bore walls 84. And only the holddown is replaced instead removing and reinstalling bearing sleeves in the insert rollers. (In both figures, the diameter of the pin is exaggeratedly small relative to the diameter of the bore for better viewing.)

What is claimed is:

1. An insert-roller system for a roller-type peeler comprising:
    a holddown including:
        a shank;
        a holder at one end of the shank;
        a pin retained by the holder;

an insert roller made of a wear-resistant material and having a bore at one end bounded by a bore wall for receiving the pin of the holddown;

wherein the pin is made of a different material from the insert roller and serves as a bearing surface against the bore wall as the insert roller rotates on the pin.

2. An insert-roller system as in claim 1 wherein the pin is made of a bronze material and the insert roller is made of steel.

3. An insert-roller system as in claim 1 wherein the shank and the pin are made of different materials.

4. An insert-roller system as in claim 1 wherein the pin has a coned head and the bore has a concave blind end bearing against the coned head of the pin acting as a thrust bearing.

5. An insert-roller system as in claim 4 wherein the distance between the holder and the tip of the coned head of the pin is greater than the length of the bore in the insert roller.

6. An insert-roller system as in claim 1 wherein the pin extends outward in opposite directions from the holder and terminates in coned heads at opposite ends.

7. An insert-roller system as in claim 1 comprising a series of insert rollers rotatably arranged end to end by holddowns between consecutive insert rollers.

8. An insert roller as in claim 1 further comprising a ball bearing disposed in the bore between an end of the pin and an interior end of the bore to serve as a thrust bearing.

9. An insert-roller system for a roller-type peeler comprising:

a holddown including:
a shank;
a holder at one end of the shank;
a pin retained by the holder, the pin extending outward from the holder to a coned head;
an insert roller having an axial bore for receiving the pin of the holddown and a concave blind end bearing against the coned head of the pin serving as a thrust bearing to prevent contact between the insert roller and the holder.

10. An insert-roller system as in claim 9 wherein the distance between the holder and the tip of the coned head of the pin is greater than the length of the bore in the insert roller.

11. An insert-roller system as in claim 9 wherein the insert roller is made of a wear-resistant material and the pin is made of a different material.

12. A peeler comprising:
an array of reciprocating upper rollers spaced apart laterally across the width of the peeler;
an array of lower rollers underlying the array of upper rollers along a portion of the length of the peeler at positions below and laterally offset from the upper rollers;
a plurality of series of insert rollers made of a wear-resistant material, each series extending along the length of the peeler and resting simultaneously on one of the upper rollers and one of the adjacent lower rollers, wherein each of the insert rollers has opposite ends with an axial bore in each end;
a plurality of holddowns, each having a holder retaining a pin at an upper end and a shank extending downward from the holder through a gap between one of the upper rollers and an adjacent one of the lower rollers and biased downward, wherein the pins are made of a bearing material different from the wear-resistant material of the insert rollers;
wherein the pins of the holddowns are received in the axial bores of the insert rollers and the insert rollers rotate on the pins.

13. A peeler as in claim 12 wherein the pins are made of a bronze material and the insert rollers are made of steel.

14. A peeler as in claim 12 wherein the pins have coned heads and the axial bores have concave blind ends bearing against the coned heads of the pins serving as thrust bearings to prevent contact between the insert rollers and the holders.

15. A peeler as in claim 14 wherein the distance between the holder and the tip of the coned head of each of the pins is greater than the length of the bore in the insert rollers.

16. A peeler as in claim 12 wherein the holddowns at the opposite ends of the series of insert rollers have pins with a single coned head and the holddowns between consecutive insert rollers in the series have pins extending outward in opposite directions from the holder to coned heads.

* * * * *